(12) United States Patent
Akaike et al.

(10) Patent No.: US 6,851,753 B2
(45) Date of Patent: Feb. 8, 2005

(54) SEAT LIFTING DEVICES

(75) Inventors: Fumitoshi Akaike, Nisshin (JP); Kazuhisa Tatematsu, Nagoya (JP); Seiichiro Inadome, Toyota (JP); Seiya Nishimura, Okazaki (JP)

(73) Assignee: Araco Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/438,286

(22) Filed: May 14, 2003

(65) Prior Publication Data
US 2003/0218369 A1 Nov. 27, 2003

(30) Foreign Application Priority Data

May 15, 2002 (JP) ........................................ 2002-140076

(51) Int. Cl.[7] ........................... B60N 2/42; B60N 2/427; B60R 21/00
(52) U.S. Cl. ............................ 297/344.17; 297/344.15; 297/216.1; 297/216.15; 297/216.16; 297/216.18; 248/421
(58) Field of Search ........................ 297/344.17, 344.15, 297/216.15, 216.16, 216.17, 216.18, 216.1; 248/421, 419, 420

(56) References Cited

U.S. PATENT DOCUMENTS

| | | | | |
|---|---|---|---|---|
| 4,487,390 A | * | 12/1984 | Miyashita | ................. 248/396 |
| 5,622,406 A | * | 4/1997 | Meschkat et al. | ........ 248/421 X |
| 5,709,364 A | * | 1/1998 | Araki et al. | ........ 297/344.17 X |
| 5,775,780 A | * | 7/1998 | Murphy et al. | ...... 297/216.18 X |
| 5,782,533 A | | 7/1998 | Fischer et al. | ....... 297/344.15 X |
| 5,882,061 A | | 3/1999 | Guillouet | ............ 297/344.15 X |
| 6,250,705 B1 | | 6/2001 | Zuch | ................... 297/216.16 X |
| 6,254,181 B1 | * | 7/2001 | Aufrere et al. | ........... 297/216.1 |
| 6,264,275 B1 | * | 7/2001 | Frohnhaus et al. | . 297/344.17 X |
| 6,347,778 B1 | | 2/2002 | Koga et al. | .......... 297/344.17 X |
| 6,572,065 B2 | * | 6/2003 | Koga et al. | .......... 297/344.17 X |
| 2002/0024242 A1 | * | 2/2002 | Becker et al. | ............ 297/216.1 |

FOREIGN PATENT DOCUMENTS

JP 05178137 A * 7/1993 ............. 297/216.18

* cited by examiner

*Primary Examiner*—Rodney B. White
(74) *Attorney, Agent, or Firm*—Patterson, Thuente, Skaar & Christensen, P.A.

(57) ABSTRACT

Seat lifting devices disposed between a seat support for supporting a seat cushion and a seat mount for mounting the seat support are taught that comprise a front and rear linking mechanisms movably interconnecting the seat support and the seat mount. These linking mechanisms are arranged and constructed to vertically adjust the seat cushion when operated. The rear linking mechanism comprises a first linking arm that is pivotally connected to the seat mount and the seat support, and a second linking arm that is pivotally connected to the seat support. The second linking arm is provided with a rear slide pin that slidably engages a rear guide slot formed in the seat mount. The rear slide pin is arranged and constructed to engage a plurality of teeth formed in the rear guide slot when a large force is applied to the seat support in a direction to separate the seat support from the seat mount.

7 Claims, 5 Drawing Sheets

SEAT LIFTING DEVICES

This application claims priority to Japanese Patent Application Serial Number 2002-140076, the contents of which are incorporated herein by reference.

BACKGROUND OF THE INVENTION

1. Field of the Invention

The present invention relates to seat vertical devices or seat lifting devices for adjusting height of a seat cushion of a vehicle seat.

2. Description of the Related Art

A seat vertical device or seat lifting device for adjusting height of a seat cushion of a vehicle seat is taught, for example, by U.S. Pat. No. 6,347,778 and Japanese Laid-Open Patent Publication No. 2001-163091.

Typically, a vehicle seat comprises a seat back and a seat cushion. The seat back and the seat cushion are respectively supported by a seat back frame and a cushion frame. The cushion frame includes a pair of opposing elongated plate-shaped members or frame elements. The cushion frame thus constructed is seated on a seat slide device that are disposed on a vehicle floor. The seat slide device has a pair of slide rail assemblies that are arranged in parallel each other. The slide rail assemblies are positioned such that the distance therebetween is substantially identical to the distance between the frame elements of the cushion frame. Each of the slide rail assemblies includes an upper rail and a lower rail. The lower rail is affixed to the vehicle floor. The upper rail slidably engages the affixed lower rail.

In the known art described in U.S. Pat. No. 6,347,778, each of the frame elements of the cushion frame is linked to the upper rail of the slide rail assembly via front and rear linking mechanisms, which mechanisms constitute a seat lifting device. The front and rear linking mechanisms respectively include a front bracket and a rear bracket that are upwardly projected from the upper rail. The front linking mechanism further includes a front arm, which arm is pivotally attached to the frame element and the front bracket via pivot pins. Similarly, the rear linking mechanism further includes a rear arm, which arm is pivotally attached to the frame element and the rear bracket via pivot pins.

Further, the seat lifting device includes a drive mechanism, which drive mechanism also constitutes the seat lifting device. The drive mechanism includes a lever, an intermediate bracket upwardly project from the upper rail and a linking rod. The lever is pivotally attached to the intermediate bracket in its middle portion. One end of the linking rod is pivotally connected to the rear arm. Also, the other end of the linking rod is pivotally connected to an upper end of the lever. Further, a nut is rotatably attached to a lower end of the lever. This nut threadably engages a threaded shaft that is driven or rotated by a drive means or motor. Therefore, when the threaded shaft is rotated by the motor, the nut moves along the threaded shaft, thereby pivoting the lever around the intermediate bracket. As a result, the linking rod connected to the lever moves back and forth, thereby pivoting the rear arm. Thus, the flame element can be lifted, so that the height of the vehicle seat cushion can be adjusted.

In the known seat lifting device, the rear arm is formed with a laterally elongated slot (first slot) and a vertically elongated arcuate slot (second slot) having a plurality of concave portions arranged therealong. On the other hand, the rear arm is provided with a pivot pin that is received in the first slot and a locking pin that is received in the second slot.

According to the known seat lifting device, when an excessive forward and upward force is applied to the cushion frame via a seatbelt that is attached thereto, each of the frame elements of the cushion frame may be pulled forwardly and upwardly and moves in this direction. As a result, the rear arm rotates around the pivot pin. However, because the pivot pin is received within the elongated slot, the rear arm forwardly is shifted, thereby engaging the locking pin with one of the concave portions of the second slot. Thus, the seat lifting device is locked, thereby preventing the frame element from further moving forwardly and upwardly. As a result, the rear arm can be effectively prevented from further rotating around the pivot pin. Therefore, the drive mechanism that is linked to the rear arm can be effectively prevented from being subjected to an undesirable large force.

As will be recognized, if the seat lifting device is not locked when the excessive forward and upward force is applied to the cushion frame, the frame element cannot be prevented from moving forwardly and upwardly. Therefore, the rear arm can freely rotate around the pivot pin. As a result, a considerable force may be applied to the drive mechanism linked to the rear arm. Such a force may exert undesirable effects on the drive mechanism.

SUMMARY OF THE INVENTION

It is, accordingly, one object of the present teachings to provide improved seat lifting devices for adjusting height of a seat cushion of a vehicle seat.

For example, in one aspect of the present teachings, seat lifting devices disposed between a seat support for supporting a seat cushion and a seat mount for mounting the seat support are taught that comprise a front and rear linking mechanisms movably interconnecting the seat support and the seat mount. These linking mechanisms are arranged and constructed to vertically adjust the seat cushion when operated. The rear linking mechanism comprises a first linking arm that is pivotally connected to the seat mount and the seat support, and a second linking arm that is pivotally connected to the seat support. The second linking arm is provided with a rear slide pin that slidably engages a rear guide slot formed in the seat mount. The rear slide pin is arranged and constructed to engage a plurality of teeth formed in the rear guide slot when a large force is applied to the seat support in a direction to separate the seat support from the seat mount.

In such seat lifting devices, when such a large force is applied to the seat support, the seat support can move along a predetermined path. At this time, the rear linking mechanism can also move along a predetermined path. Therefore, even if the direction of the large force applied to the seat support is changed, the seat lifting device can always be immediately and reliably locked. As a result, forward and rearward motion of the seat support can always be minimized.

Other objects, features and advantage of the present invention will be ready understood after reading the following detailed description together with the accompanying drawings and the claims.

DETAILED DESCRIPTION OF THE INVENTION

In one embodiment of the present teachings, seat lifting devices disposed between a cushion frame for supporting a seat cushion and a seat slide device for mounting the cushion frame may comprise a front and rear linking mechanisms movably interconnecting the cushion frame and the seat slide device. These linking mechanisms may preferably be arranged and constructed to vertically adjust the seat cushion when operated. The rear linking mechanism preferably comprises a first linking arm that is pivotally connected to the seat slide device and the cushion frame, and a second linking arm that is pivotally connected to the cushion frame. The second linking arm may preferably be provided with a rear slide pin that slidably engages a rear guide slot formed in the seat slide device. The rear slide pin may preferably be arranged and constructed to engage a plurality of teeth formed in the rear guide slot when a large force is applied to the cushion frame in a direction to separate the cushion frame from the seat slide device. Optionally, the teeth may preferably be a series of teeth that are formed along an upper edge of the rear guide slot. Further, the rear slide pin may preferably have a recess that can engage the teeth of the rear guide slot.

Optionally, the front linking mechanism may comprise a first linking arm that is pivotally connected to the seat slide device and the cushion frame, and a second linking arm that is pivotally connected to the cushion frame. The second linking arm is provided with a front slide pin that slidably engages a front guide slot formed in the seat slide device.

Optionally, the front and rear slide pins may preferably interconnected by means of a linking member. Preferably, the linking member may be connected to a drive mechanism.

In another optional embodiment, the first linking arm of the rear linking mechanism may have a first upper end that is pivotally connected to an upper end of the second linking arm, and a second upper end that is pivotally connected to the cushion frame. Preferably, the second upper end may be connected to a drive mechanism.

Two detailed representative embodiments of the present teachings will now be described in further detail with reference to FIGS. 1 to 5.

First Detailed Representative Embodiment

The first detailed representative embodiment will now be described with reference to FIGS. 1 to 4.

Figure 1:
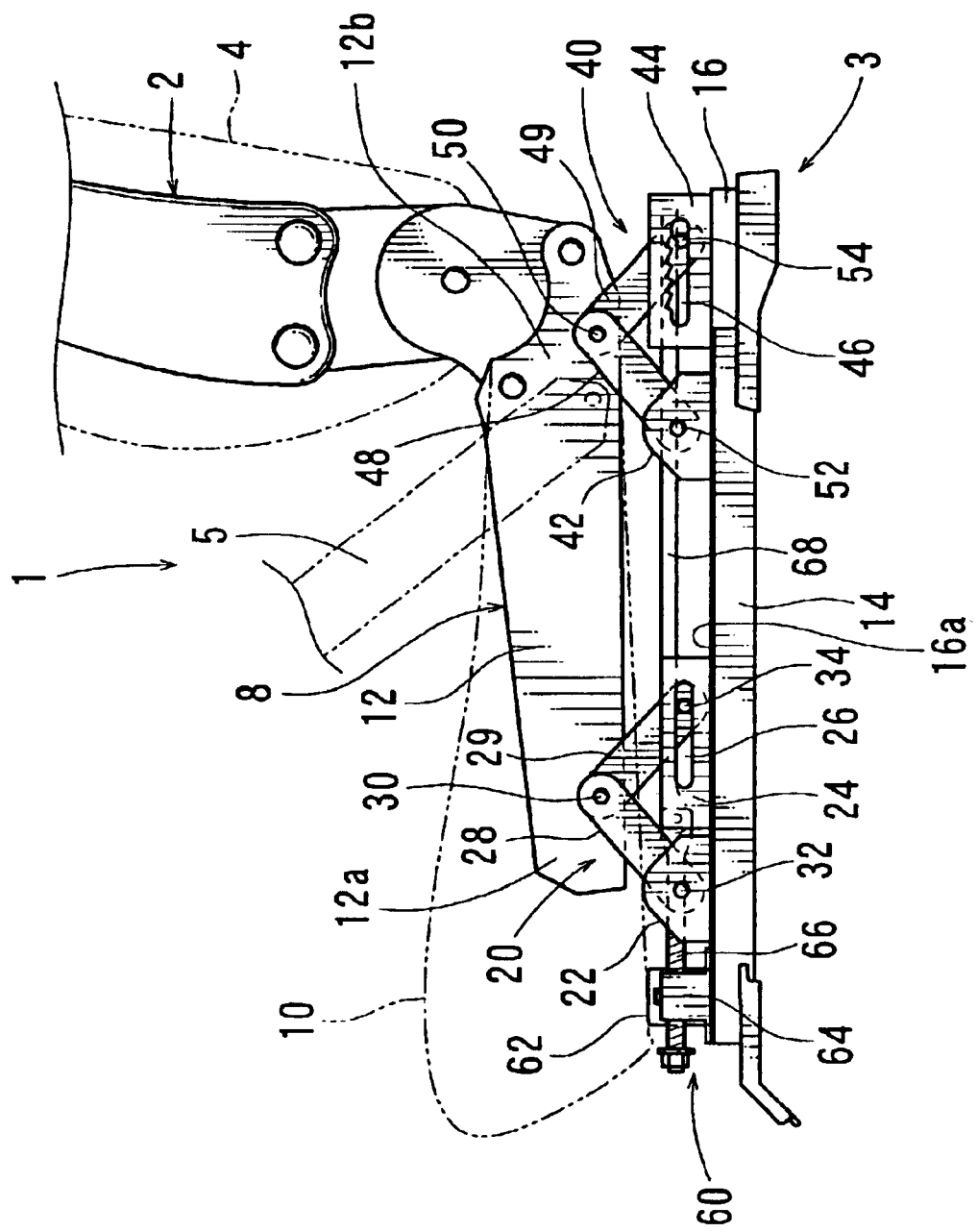
FIG. 1 is a side view illustrating a vehicle seat having a seat lifting device according to a first embodiment of the present teachings, in which the vehicle seat is adjusted to a lowered position.
Figure 2:
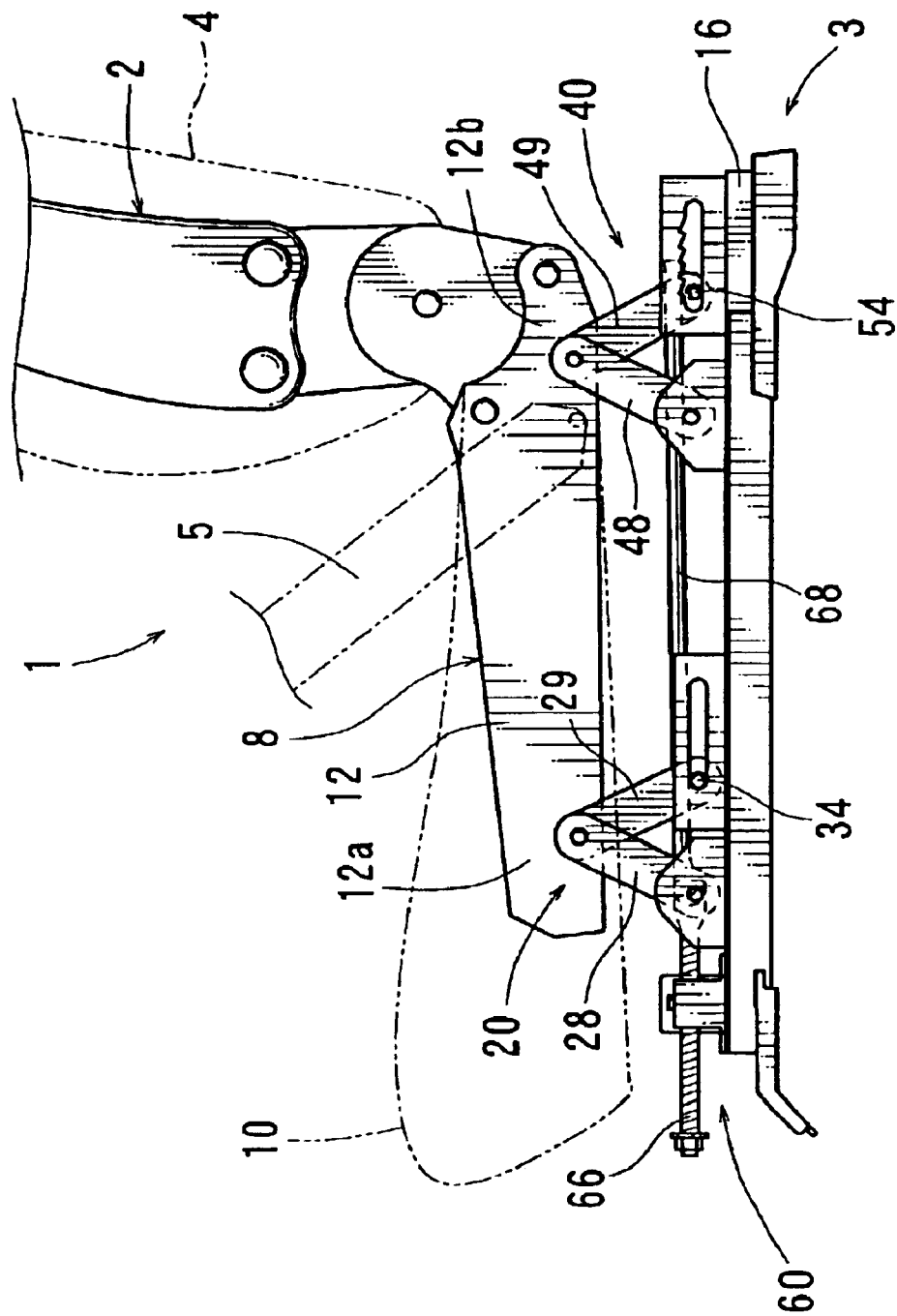
FIG. 2 is a side view illustrating the vehicle seat, in which the vehicle seat is adjusted to a lifted position.

As shown in FIGS. 1 and 2, a vehicle seat 1 of this embodiment generally comprises a seat back 4 and a seat cushion 10. The seat back 4 and the seat cushion 10 are respectively supported by a seat back frame 2 and a cushion frame (i.e., seat support) 8. Typically, the cushion frame 8 includes a pair of opposing elongated plate-shaped members or frame elements 12 (one of which is shown) and a connector member (not shown). Each of the frame elements 12 has a front portion 12a and a rear portion 12b. The rear portions 12b of the frame elements 12 are interconnected by the connector member, thereby defining the cushion frame 8 as a unit. In addition, a seatbelt 5 may preferably connected to the frame elements 12 at desired positions adjacent to the rear portions 12b.

The cushion frame 8 thus constructed is seated on a pair of slide rail assemblies 3 (one of which is shown) of a seat slide device (i.e., seat mount) that are disposed in parallel on a vehicle floor (not shown). The slide rail assemblies 3 may be positioned such that the distance therebetween is substantially identical to the distance between the frame elements 12 of the cushion frame 8. Each of the slide rail assemblies 3 may include an upper rail 16 and a lower rail 14. The lower rail 14 may be affixed to the vehicle floor. The upper rail 16 slidably engages the affixed lower rail 14. In addition, the frame elements 12 of the cushion frame 8 are linked to the upper rails 16 via a pair of front linking mechanisms 20 (one of which is shown) and a pair of rear linking mechanisms 40 (one of which is shown), which mechanisms constitute a seat lifting device. Thus, the cushion frame 8 may preferably be operatively connected to the slide rail assemblies 16.

The cushion frame 8 can be moved back and forth by sliding the upper rail 16 back and forth along the lower rail 14. Therefore, the longitudinal position of the seat cushion 10 can be adjusted by sliding the upper rail 16 along the lower rail 14. In addition, the cushion frame 8 can be moved up and down by operating the seat lifting device. Therefore, the vertical position of the seat cushion 8 can be adjusted by operating the seat lifting device.

Figure 3:
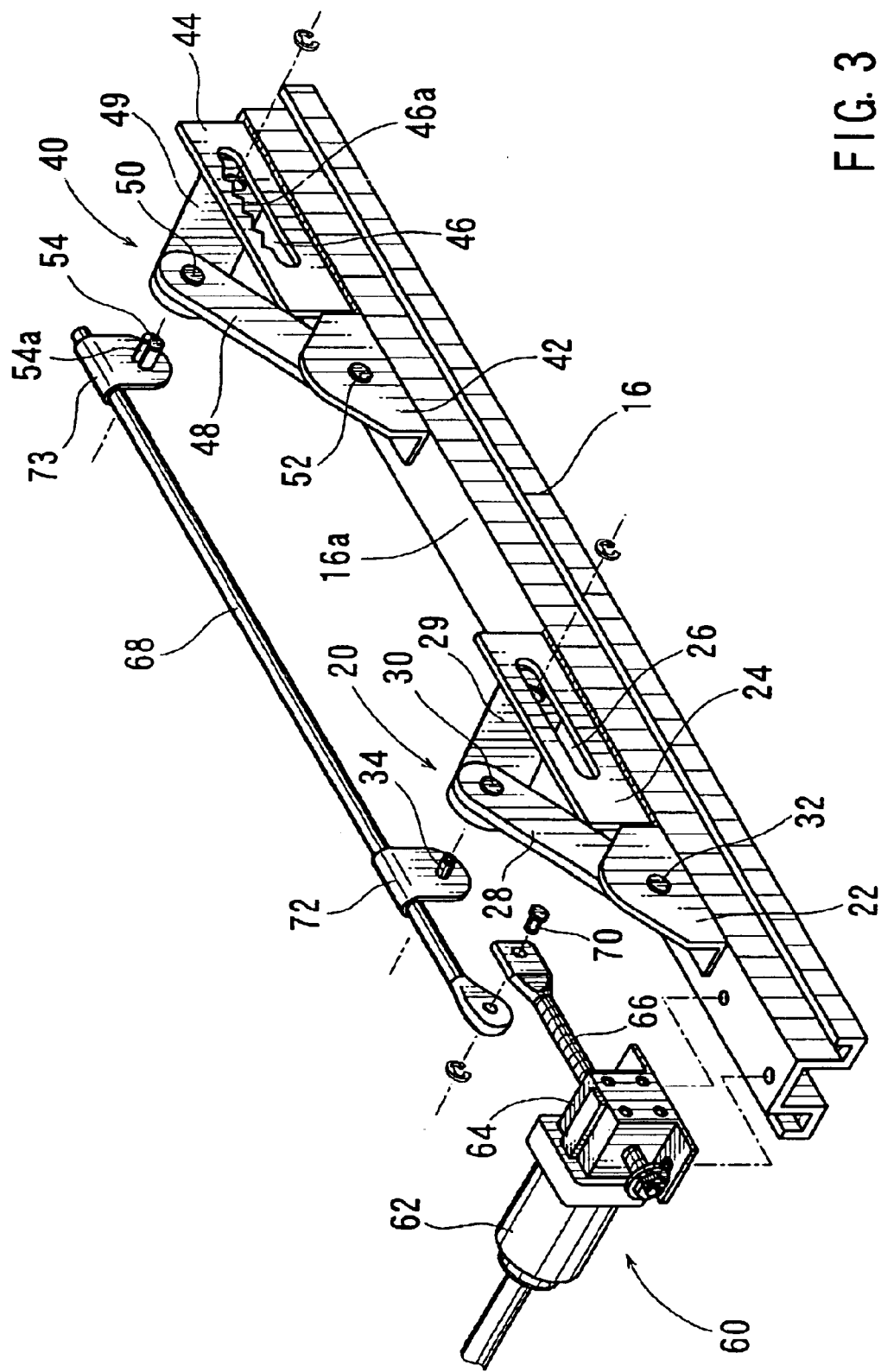
FIG. 3 is an exploded perspective view of the seat lifting device disposed on a upper rail of a seat slide device.

As shown in FIGS. 1 to 3, each of the front linking mechanisms 20 of the seat lifting device may include first and second plate-shaped linking arms 28 and 29. Upper ends of the arms 28 and 29 are pivotally connected to the front portion 12a of the frame element 12 via a common pivot pin 30 such that the arms 28 and 29 can pivot back and forth around the pivot pin 30. Further, the front linking mechanism 20 may preferably include a first or pivot bracket 22 and a second or guide bracket 24 that are fixed to an upper surface 16a of the upper rail 16. As best shown in FIG. 3, the second bracket 24 is formed with an elongated front guide slot 26 that longitudinally extends along the upper rail 16. A lower end of the first arm 28 is pivotally connected to the first bracket 22 via a pivot pin 32 such that the first arm 28 can pivot back and forth around the pivot pin 32. On the other hand, a lower end of the second arm 29 is provided with a front slider or front slide pin 34. The slide pin 34 slidably engages the slot 26 of the second bracket 24 such that the lower end of the second arm 29 can move back and forth.

Figure 4:
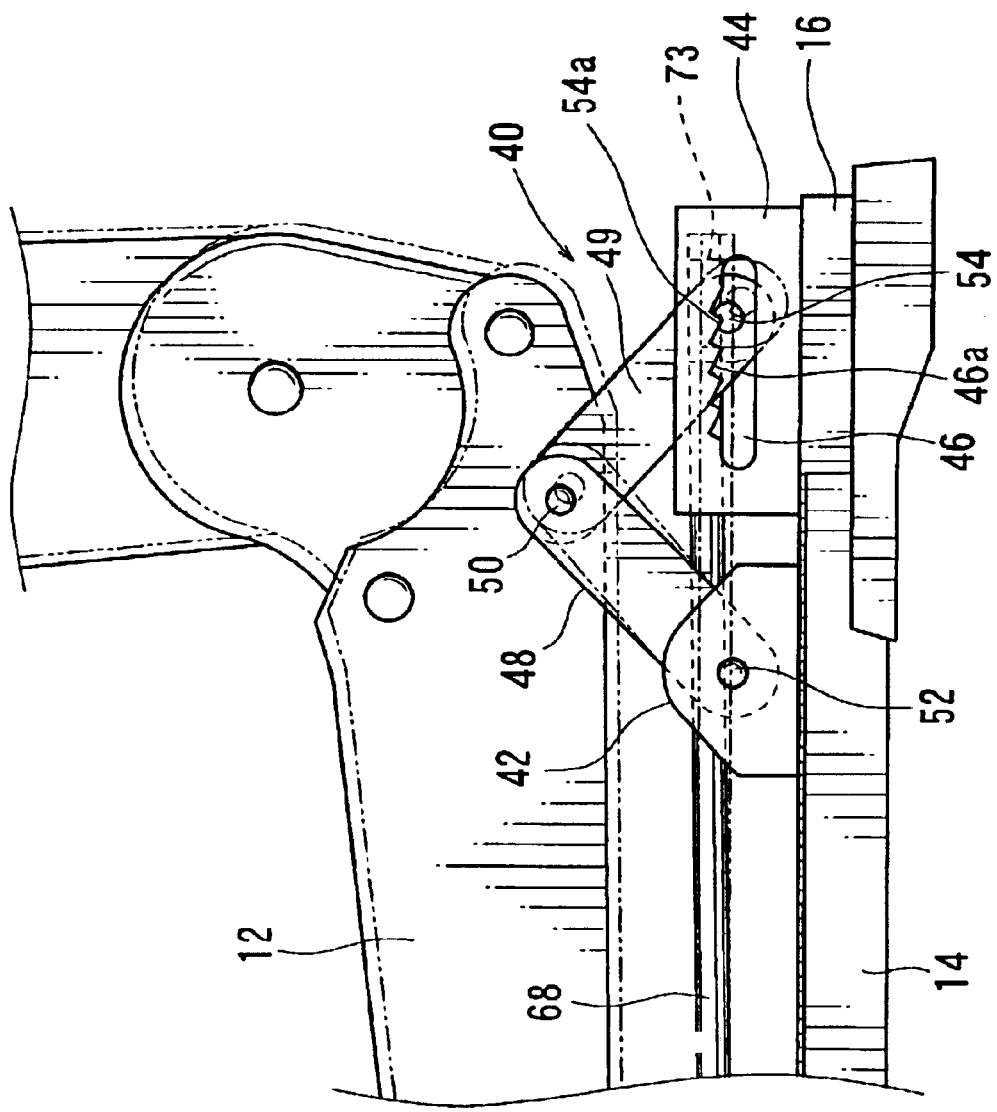
FIG. 4 is an enlarged partially side view of the vehicle seat.

As shown in FIGS. 1 to 4, each of the rear linking mechanisms 40 of the seat lifting device may include first and second plate-shaped linking arms 48 and 49. Upper ends of the arms 48 and 49 are pivotally connected to the rear portion 12b of the frame element 12 via a common pivot pin 50 such that the arms 48 and 49 can pivot back and forth around the pivot pin 50. Further, the rear linking mechanism 40 may preferably include a first or pivot bracket 42 and a second or guide bracket 44 that are fixed to the upper surface 16a of the upper rail 16. As best shown in FIGS. 3 and 4, the second bracket 44 is formed with an elongated rear guide slot 46 that longitudinally extends along the upper rail 16. As will be apparent form the drawings, unlike the front guide slot 26 of the front linking mechanism 20, the slot 46 may have a series of engagement projections or teeth 46a that are formed along its upper edge. A lower end of the first arm 48 is pivotally connected to the first bracket 42 via a pivot pin 52 such that the first arm 48 can pivot back and forth around the pivot pin 52. On the other hand, a lower end of the second arm 49 is provided with a rear slider or rear slide pin 54. The slide pin 54 slidably engages the slot 46 of the guide bracket 44 such that the lower end of the second arm 49 can move back and forth. Further, the slide pin 54 is formed with a notch or recess 54a that extends along a longitudinal axis thereof. As will be appreciated, the shape of the recess 54a may preferably be shaped to engage the teeth 46a formed in the slot 46.

As best shown in FIG. 3, the seat lifting device may further include a pair of drive mechanisms 60 (one of which is shown). Each of the drive mechanisms 60 may preferably includes a drive source assembly that comprises a gear box 64 and a motor 62 coupled thereto. The drive source assembly is positioned adjacent to a forwardmost position of the upper rail 16 and is fixedly mounted on the upper surface 16a of the upper rail 16. The gear box 64 has a threaded shaft 66 extending therethrough. As will be appreciated, the threaded shaft 66 threadably engages a drive gear (not shown) received in the gear box 64, so as to move back and forth when the motor 62 is forwardly or reversely driven. A rear end of the threaded shaft 66 may preferably be connected to a linking member or linking rod 68 via a connector pin 70.

The linking rod 68 has a first or front bracket 72 and a second or rear bracket 73 that are fixedly attached thereto. The first bracket 72 is connected to the slide pin 34 of the front linking mechanism 20. On the other hand, the second bracket 73 is connected to the slide pin 54 of the rear linking mechanism 40. In other words, the slide pins 34 and 54 are interconnected by means of the linking rod 68. Therefore, the slide pins 34 and 54 can synchronously move back and forth and respectively simultaneously slide along the slots 26 and 46 when the threaded shaft 66 moves back and forth.

According to the seat lifting device of this embodiment, when each of the drive mechanisms 60 is actuated, the front and rear linking mechanisms 20 and 40 of the seat lifting device are operated, thereby changing height of the seat cushion 10. That is, when the motor 62 of the drive mechanism 60 is driven forwardly or reversely, the threaded shaft 66 moves forwardly or backwardly, thereby moving the linking rod 68 forwardly or backwardly. As a result, the slide pins 34 and 54 synchronously move forwardly or backwardly and slide along the slots 26 and 46 forwardly or backwardly, respectively, thereby simultaneously moving the lower ends of the second arms 29 and 49 forwardly or backwardly. Consequently, the first and second arms 28 and 29 and the first and second arms 48 and 49 pivotally rotate around the pivot pins 30 and 32 and the pivot pins 50 and 52, respectively, so that the front and rear linking mechanisms 20 and 40 rise or fall down. As a result, the frame elements 12 linked to the linking mechanisms 20 and 40 are shifted upwardly or downwardly. Thus, the seat cushion 10 may preferably be continuously vertically adjusted, so as to have various vertical positions (e.g., a lowered position (FIG. 1) and a lifted position (FIG. 2)).

According to the seat lifting device of this embodiment, when a large or excessive force is applied to the cushion frame 8 via the seatbelt 5 that is attached thereto in a direction to separate the cushion frame 8 from the seat slide device, each of the frame elements 12 of the cushion frame 8 is pulled forwardly and upwardly and moves in this direction. As a result, the front and rear linking mechanisms 20 and 40 that is linked to the frame element 12 are pulled and lifted up. That is, the first arms 28 and 48 respectively pivotally rotate around the pivot pins 32 and 52, and the second arms 29 and 49 move upwardly and forwardly without pivotal rotation. As shown in FIG. 4, when the frame element 12 moves from a rest position shown by a broken line to a shifted position shown by a solid line, the rear linking mechanism 40 is lifted up from a normal position shown by a broken line to an engaging position shown by a solid line, thereby engaging the recess 54a of the slide pin 54 of the second arm 49 with the teeth 46a of the slot 46 of the guide bracket 44. As a result, the seat lifting device is locked, thereby preventing the frame element 12 from further moving forwardly and upwardly. Thus, both of the front and rear linking mechanisms 20 and 40 may be effectively prevented from further being lifted up. Therefore, the drive mechanism 60 that is linked to these linking mechanisms 20 and 40 can be effectively prevented from being applied with a considerable large force.

As will be easily understood, if the seat lifting device is not locked when such an excessive force is applied to the cushion frame 8, the frame element 12 cannot be prevented from moving forwardly and upwardly. Therefore, the frame element 12 can further move beyond the shifted position. As a result, the front and rear linking mechanisms 20 and 40 can be further lifted up. That is, the first arms 28 and 48 can respectively further pivotally rotate around the pivot pins 32 and 52, and the second arms 29 and 49 can respectively pivotally rotate around the pivot pins 30 and 50 while forwardly sliding the slide pins 34 and 54 along the slots 26 and 46. Consequently, the considerable large force may be applied to the linking rod 68 via the slide pins 34 and 54. This force may be transmitted to the drive source assemblies of the drive mechanisms 60 via the linking rods 68, thereby exerting an undesirable effect thereon.

In this embodiment, as will be apparent from FIG. 4, when the excessive force is applied to the cushion frame 8 via the seatbelt 5, each of the frame elements 12 can move from the rest position to the shifted position along a predetermined path, because its motion may preferably be restricted by the first arm 48 that is pivotally connected to the first bracket 42 via the pivot pins 52. At this time, the second arm 49 of the rear linking mechanism 40 can also move from the normal position to the engaging position along a predetermined path, because its motion may be restricted by the first arm 48. As a result, even if the direction of the excessive force applied to the cushion frame 8 is deflected or changed, the slide pin 54 attached to the second arm 49 can substantially move along a predetermined path. Therefore, the recess 54a of the slide pin 54 can always immediately and reliably engage the teeth 46a of the slot 46. That is, the seat lifting device can always be immediately and reliably locked regardless of the direction of the applied excessive force. As a result, forward and upward motion of the frame element 12 can always be minimized. Therefore, the drive mechanism 60 can always be effectively prevented from being applied with such a considerable large force.

Further, the excessive force applied to the frame element 12 may act to longitudinally pull the second arm 49. Therefore, the second arm 49 can sufficiently resist such a force. As a result, the seat lifting device can be reliably locked.

Further, the seat lifting device is not limited to the representative embodiment. For example, the front linking mechanism 20 may have the same construction as the rear linking mechanism 40. That is, the slot 26 and the slide pin 34 can respectively be formed with a series of teeth and a recess such that the front linking mechanism 20 can be locked.

Second Detailed Representative Embodiment

Figure 5:
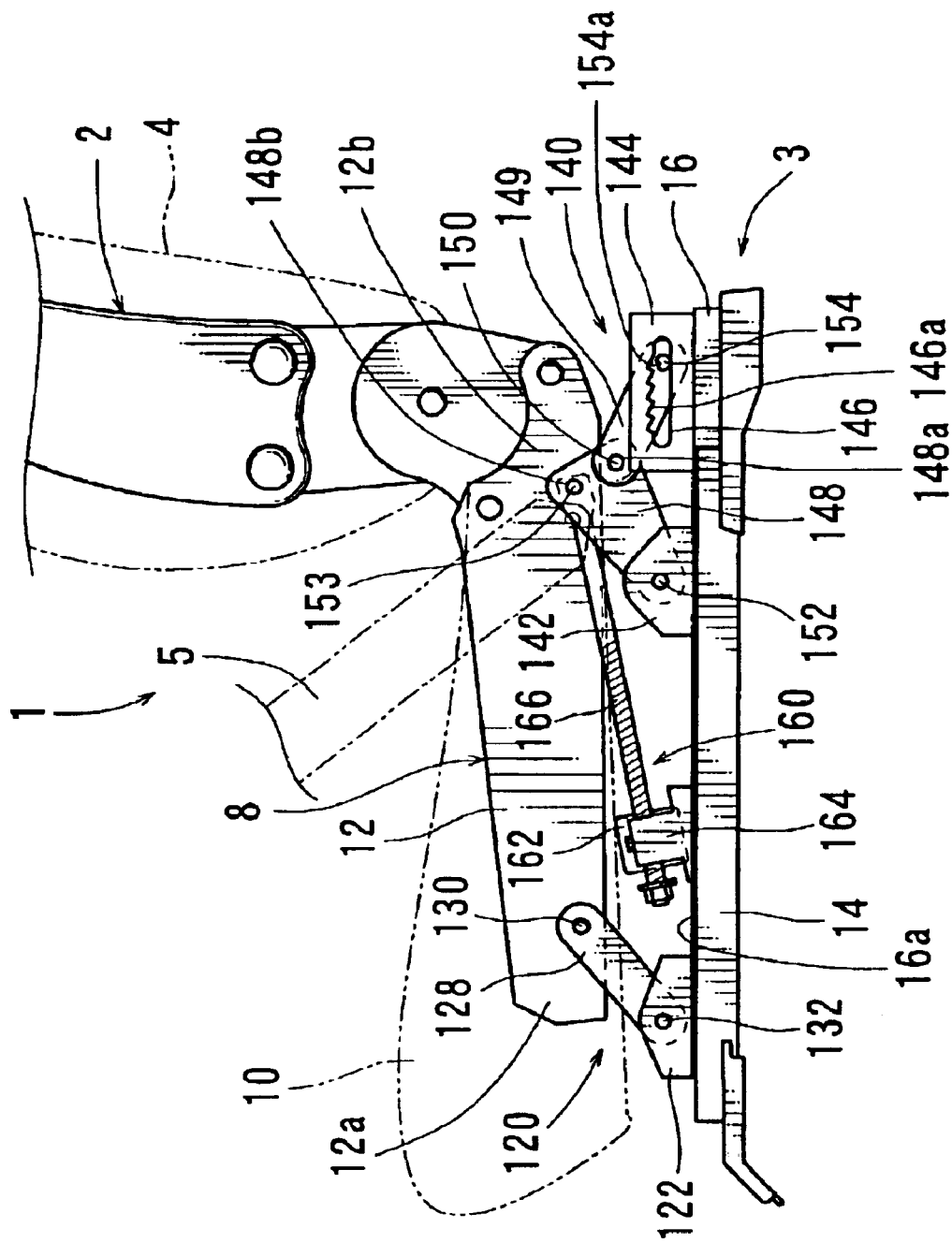
FIG. 5 is a side view similar to FIG. 1, which view illustrates a vehicle seat having a seat lifting device according to a second embodiment of the present teachings.

The second detailed representative embodiment will now described with reference to FIG. 5. Because the second embodiment relates to the first embodiment, only constructions and elements that are different from the first embodiment will be explained in detail. Elements that are the same in the first and second embodiments will be identified by the same reference numerals and detailed description of such elements will be omitted.

In this embodiment, the frame elements 12 of the cushion frame 8 are linked to the upper rails 16 via a pair of front linking mechanisms 120 (one of which is shown) and a pair of rear linking mechanisms 140 (one of which is shown), which mechanisms constitute a seat lifting device.

Each of the front linking mechanisms 120 of the seat lifting device may include a single plate-shaped linking arm 128. An upper end of the arm 128 is pivotally connected to the front portion 12a of the frame element 12 via a pivot pin 130 such that the arm 128 can pivot back and forth around the pivot pin 130. Further, the front linking mechanism 120 may preferably include a pivot bracket 122 that is fixed to the upper surface 16a of the upper rail 16. A lower end of the arm 128 is pivotally connected to the bracket 122 via a pivot pin 132 such that the arm 128 can pivot back and forth around the pivot pin 132.

Each of the rear linking mechanisms 140 of the seat lifting device may include first and second plate-shaped linking arms 148 and 149. A first upper end 148a of the arm 148 and an upper end of the arm 149 are pivotally interconnected via a pivot pin 150 such that the arms 148 and 149 can pivot around the pivot pin 150. A second upper end 148b of the first arm 148 is pivotally connected to the rear portion 12b of the frame element 12 via a pivot pin 153 such that the first arm 148 can pivot back and forth around the pivot pin 153. Further, the rear linking mechanism 140 may further include a first or pivot bracket 142 and a second or guide bracket 144 that are fixed to the upper surface 16a of the upper rail 16. The second bracket 144 is formed with an elongated guide slot 146 that longitudinally extends along the upper rail 16. Similar to the slot 46 of the first embodiment, the slot 146 may have a series of engagement projections or teeth 146a along its upper edge. A lower end of the first arm 148 is pivotally connected to the first bracket 142 via a pivot pin 152. On the other hand, a lower end of the second arm 149 is provided with a slider or slide pin 154. The slide pin 154 slidably engages the slot 146 of the second bracket 144 such that the lower end of the second arm 49 can move back and forth. Further, similar to the slide pin 54 of the first embodiment, the slide pin 154 is formed with a notch or recess 154a that extends along a longitudinal axis thereof. The recess 154a may preferably be shaped to engage the teeth 146a formed in the slot 146.

Similar to the first embodiment, the seat lifting device may further include a pair of drive mechanisms 160 (one of which is shown in FIG. 3). Each of the drive mechanisms 160 may preferably includes a drive source assembly that comprises a motor 162 and a gear box 164 associated thereto. Unlike the first embodiment, this drive source assembly is positioned between the front and rear linking mechanisms 120 and 140 and is fixedly mounted on the upper surface 16a of the upper rail 16. The gear box 164 has a threaded shaft 166 extending therethrough. The threaded shaft 166 threadably engages a drive gear (not shown) received in the gear box 164, so as to move back and forth when the motor 162 is forwardly or reversely driven. A rear end of the threaded shaft 166 may be connected to the second upper end 148b of the first arm 148, preferably, to the pivot pin 153.

According to the seat lifting device of this embodiment, when each of the drive mechanisms 160 is actuated, the front and rear linking mechanisms 120 and 140 of the seat lifting device are operated, thereby changing height of the seat cushion 10. That is, when the motor 162 of the drive mechanism 160 is driven forwardly or reversely, the threaded shaft 166 moves forwardly or backwardly, thereby pivoting the arms 128 and 148 of the front and rear linking mechanisms 120 and 140. Consequently, the front and rear linking mechanisms 120 and 140 rise or fall down. Therefore, the frame elements 12 linked to the linking mechanisms 120 and 140 are shifted upwardly or downwardly. Further, at this time, the second arm 149 dependently pivotally moves, so that the slide pin 154 may preferably slide along the slot 146. Thus, the seat cushion 10 can be continuously vertically adjusted, so as to have various vertical positions.

According to the seat lifting device of this embodiment, when an excessive force is applied to the cushion frame 8 via the seatbelt 5 in a direction to separate the cushion frame 8 from the seat slide device, each of the frame elements 12 is pulled forwardly and upwardly and moves in this direction, thereby upwardly moving the front and rear linking mechanisms 120 and 140. At this time, the second arm 149 of the rear linking mechanism 140 is upwardly lifted up, thereby engaging the recess 154a of the slide pin 154 with the teeth 146a of the slot 146. As a result, the rear linking mechanism 140 is locked, thereby preventing the frame element 12 from further moving forwardly and upwardly. Therefore, the drive mechanism 160 can be effectively prevented from being subjected to a considerable large force.

In this embodiment, unlike the first embodiment, the front linking mechanism 120 includes only the linking arm 128 and the threaded shaft 166 of the drive mechanism 160 is linked to only the rear linking mechanism 140. Therefore, the seat lifting device can preferably be simplified without lowering the locking performance.

Further, the seat lifting device is not limited to the representative embodiment. For example, although the upper end of the second arm 149 is pivotally connected to the first upper end 148a of the first arm 148 via the pivot pin 150, the upper end of the second arm 149 can be pivotally connected to the rear portion 12b of the frame element 12 via the pivot pin 150.

Representative examples of the present teachings have been described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present teachings.

What is claimed is:

1. A seat lifting device operatively connected to a seat support for supporting a seat cushion and a seat mount for mounting the seat support, comprising:

front and rear linking mechanism movably interconnecting the seat support and the seat mount, the linking mechanisms being arranged and constructed to vertically adjust the seat when operated, wherein the rear linking mechanism comprises a first linking arm that is pivotally connected to the seat mount and the seat support and a second linking arm that is pivotally connected to the seat support, and the second linking arm is provided with a rear slide pin that slidably engages a rear guide slot formed in the seat mount, wherein the rear slide pin is connected to a drive mechanism such that the rear linking mechanism is operated when the rear slide pin is slid by the drive mechanism, and wherein the rear slide pin is arranged and constructed to engage a plurality of teeth formed in the rear guide slot when a large force is applied to the seat support in a direction to separate the seat support from the seat mount.

2. A seat lifting device as defined in claim 1, wherein the front linking mechanism comprising a first linking arm that is pivotally connected to the seat mount and the seat support, and a second linking arm that is pivotally connected to the seat support, and the second linking arm is provided with a front slide pin that slidably engages a front guide slot formed in the seat mount.

3. A seat lifting device as defined in claim 2, wherein the front and rear slide pins are interconnected by means of a linking member, and wherein the linking member is connected to a drive mechanism.

4. A seat lifting device as defined in claim 3, wherein the teeth comprise a series of teeth that are formed along an upper edge of the rear guide slot.

5. A seat lifting device as defined in claim 2, wherein the teeth comprise a series of teeth that are formed along an upper edge of the rear guide slot.

6. A seat lifting device as defined in claim 1, wherein the teeth comprise a series of teeth that are formed along an upper edge of the rear guide slot.

7. A seat lifting device as defined in claim 1, wherein the rear slide pin has a recess that can engage the teeth of the rear guide slot.

* * * * *